United States Patent
Wilhelm et al.

(10) Patent No.: US 6,896,012 B2
(45) Date of Patent: May 24, 2005

(54) METHOD FOR FILLING OIL FOR A TRANSMISSION AND FILLING DEVICE FOR CARRYING OUT THE METHOD

(75) Inventors: Malte Wilhelm, Saarbrücken (DE); Jürgen Schulz, Saarbrücken (DE); Christoph Kirst, Püttlingen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/491,301

(22) PCT Filed: Oct. 2, 2002

(86) PCT No.: PCT/EP02/11029
§ 371 (c)(1),
(2), (4) Date: Mar. 30, 2004

(87) PCT Pub. No.: WO03/031866
PCT Pub. Date: Apr. 17, 2003

(65) Prior Publication Data
US 2004/0206415 A1 Oct. 21, 2004

(30) Foreign Application Priority Data
Oct. 5, 2001 (DE) .......................................... 101 49 134

(51) Int. Cl.⁷ ................................................. B65B 1/04
(52) U.S. Cl. .............................. 141/59; 141/65; 141/98; 184/1.5
(58) Field of Search ............................. 141/59, 65, 98; 184/1.5

(56) References Cited

U.S. PATENT DOCUMENTS

| | | | |
|---|---|---|---|
| 4,356,480 A | 10/1982 | Dressler | 340/620 |
| 4,921,165 A | 5/1990 | Ty et al. | 236/93 R |
| 5,456,295 A | 10/1995 | Taylor et al. | 141/5 |
| 6,068,029 A | 5/2000 | Toussagnon et al. | 141/1 |

FOREIGN PATENT DOCUMENTS

| | | | | |
|---|---|---|---|---|
| DE | 196 44 738 A1 | 4/1998 | | F16H/57/04 |
| EP | 0 133 069 A1 | 2/1985 | | G01F/23/00 |
| EP | 0 589 507 A2 | 3/1994 | | G01F/23/36 |

*Primary Examiner*—Steven O. Douglas
(74) *Attorney, Agent, or Firm*—Davis & Bujold, P.L.L.C.

(57) ABSTRACT

Within the scope of the method for oil filling for transmissions, particularly for automatic transmission of a motor vehicle, by way of a filling device attached to an oil overflow orifice on the transmission, as a first step a first oil filling is effected with a basic amount, when the basic amount is filled up, a suction of excess oil is carried out during a simultaneous continuous subsequent dosing. Then follows a final oil adjustment by single subsequent dosing of a specific amount of oil while the suction is cut off.

13 Claims, 1 Drawing Sheet

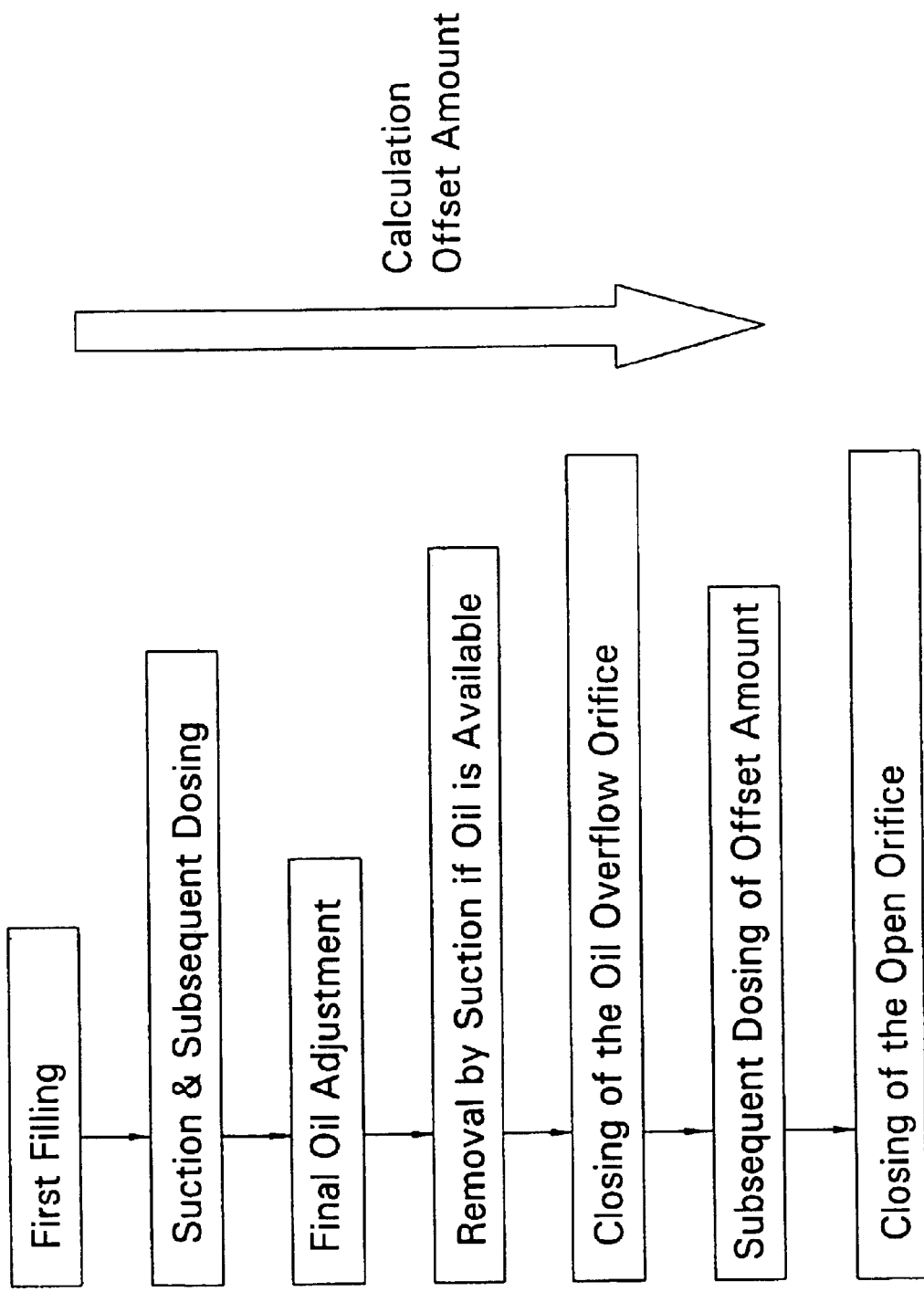

METHOD FOR FILLING OIL FOR A TRANSMISSION AND FILLING DEVICE FOR CARRYING OUT THE METHOD

This application is a national stage completion of PCT/EP02/11029 filed Oct. 2, 2002 which claims priority from German Application Ser. No. 101 49 134.4 filed Oct. 5, 2001.

FIELD OF THE INVENTION

This invention relates to a method for filling oil for a transmission or for adjusting a liquid level, specially the oil level in a transmission, and to a filling device for carrying out the method.

BACKGROUND OF THE INVENTION

What is sought at present In modern machines and industrial vehicles transmission is a durable filling with machine oil or transmission oil, a typical mileage using this transmission being on the order of 1 million kilometers.

For adjusting the oil amount or oil level in automatic transmissions, a great precision is required due to the small differences between the admissible minimum and maximum amounts of oil. In addition, the difference between the minimum and maximum to be adjusted must be as small as possible for reasons of weight.

When falling below the minimum, especially under coil, vehicle inclination (lengthwise or transverse) or acceleration (cornering, starting or braking), suction noises appear to happen in the simplest cases. In serious cases, due to insufficient pressure supply, operation interferences or also great damages to the clutch lining are possible which result in failure of the transmission.

When the maximum is exceeded, in turn, the danger consists in that at high temperatures and high rotational speeds of the transmission, the oil level rises to the point that the rotating parts sink in the oil. The direct consequence is a great coating with high oil discharge from the exhauster, the oil discharge possibly leading later to falling below the minimum with the resulting consequences. When the maximum is exceeded with the resulting oil escape, there is the added danger of overheating, since the exiting oil can ignite on hot parts such as the exhaust system. An oil level that is too high with the oil discharge resulting therefrom can also lead to pollution of the environment and to formation of a slippery road surface.

Therefore, an exacting adjustment of the oil amount or of the oil level proves itself to be indispensably necessary. To be taken into consideration here is the clear dependence on temperature of the automatic transmission fluid.

A simple method for adjustment of the oil level results in taking the temperature into account by means of an oil dipstick. By this method, the oil level can be adjusted only with reduced precision. An oil level adjustment, both in a cold and in a hot transmission, is fundamentally possible since a full level range for cold and also for hot is normally marked in the dipstick. It is problematic here that the oil temperature has to be either measured or evaluated. In addition, the accuracy of the filling amount depends on how accurately the oil level can be read on the dipstick. Up to the definitive adjustment, intermediate readings can be needed under certain circumstances.

Another method for oil level adjustment consists in carrying out the filling operation by means of fixed overflow edges at a precisely defined temperature. During the filling, the precision of the filling amount depends here on how precisely the temperature hits the temperature for which the overflow edge has been defined. Only relatively narrow temperature range is normally allowed here for the adjustment in order not to let the filling tolerances become too great. The consequence of this is that an oil level control is not always possible. Thus, for example, a hot running vehicle has to stand some time until the oil temperature has sunk to a level within the narrow temperature tolerances for the adjustment.

A method for electrically determining the oil level with thermal device has been described in EP 0 133 069. Also in EP 0 589 507 is disclosed another method for electric level measurement with the aid of a sensor and a calculation of the needed oil level correction for adjustments.

DE 196 44 738 A1, in addition, discloses a device for adjusting a liquid level, particularly the oil level in an automatic transmission, by means of an adjustable overflow edge or overflow aperture according to the temperature. The use of a thermostatic valve for adjusting the oil level has been disclosed in U.S. Pat. No. 4,921,165.

There are known besides fillings with fixed amounts according to the different weighting methods or by means of suction by immersion of lances, but these methods work with great tolerance.

The problem on which this invention is based is to outline a method for oil filling of transmission, particularly automatic transmissions, which makes an exact filling possible, taking into account constructional tolerances and different parts. In addition, a filling device is proposed which makes an exact dosing possible. The method must also be applicable to adjustment of the liquid level for other parts.

SUMMARY OF THE INVENTION

It is proposed for compensation of constructional tolerances and of parts that are different, the same as different filling levels of hydraulic parts (such as converters) to carry out a dynamic oil level adjustment with overflow character which adjusts the exact oil level required, preferably by means of a coaxial filling spindle with sealed nozzle which is hydraulically adjustable to the transmission overflow orifice.

It is provided within the scope of the inventive method, by means of a filling device attached to an oil overflow orifice on the transmission, as a first step to carry out a first oil filling with a basic amount. Thereafter, when the basic amount has been filled up, a suction of excess oil follows simultaneously carrying out a continuous subsequent dosing with a filling output smaller than the suction output.

At the end, a final oil adjustment follows by single subsequent dosing of a certain amount of oil while the suction is cut out; the overflow orifice on the transmission being shut after termination of the drain off period of the oil that overflows.

Within the scope of a development, an oil offset amount is calculated which is subsequently dosed via a transmission orifice. The oil offset amount is calculated on the basis of signals of a temperature sensor, which determines the oil temperature and relays the value to an attached computer, and from a correction factor for correcting parameters specific to the test bench from a factor for defining the oil cooler variants on the vehicle side and the installation angle and from an empirically determined factor for correction of the temperature range based on a defined temperature.

BRIEF DESCRIPTION OF THE DRAWING

The invention will now be described, by way of example, with reference to the accompanying drawings in which:

FIG. 1 shows a schematic block diagram of the method steps.

DETAILED DESCRIPTION OF THE INVENTION

In the first place, on a test bench, particularly a function test bench for testing the dynamic behavior of the completed transmission, after clamping the test transmission on the converter bell or after opening the pipe connections to the transmission, a filling device is hydraulically delivered to the transmission overflow orifice. The use of a coaxial filling spindle with sealed nozzle is especially advantageous.

The coaxial filling tube of the filling spindle is advantageously designed as a 2-duct system with annular surface connection and central filling tube in curved design with vertically oriented oval inlet orifice.

During the time of adaptation of the remaining test bench delivery movements required, according to the invention, there follows a first filling; a typical value for this being 4.51 filtered durable oil via both filling ducts. The course of the test starts with the static test steps of park blocking and converter pre-filling still during the basic oil input so that after release by the volume current meter and the throughflow sensor, the dynamic test course is ready to start.

When the basic amount has been filled up, by reversing the test bench hydraulic system, a suction is activated by means of a hydraulic pump which sucks excess oil via the annular surface and the second duct (duct 2).

At the same time, further pre-tempered durable oil filtered in the single passage is subsequently dosed, via the curved vertically oriented central pipe orifice (duct 1).

According to the invention, the subsequent dosing takes place continuously, via a small volume current via duct 1 in order to ensure the supply of all components in the dynamic function test. (The suction output in the duct 2 is always more than the supply volume in the duct 1).

According to the invention, a process protection is provided which takes place directly on the transmission input by means of a digital vacuum switch and a capacitive sensor in redundant faulty connection.

At the end of the test sequence, the final oil adjustment follows preferably in position P with idling rotational speed by single subsequent dosing of a specific amount of oil (a typical value is 0.31) via duct 1 while duct 2 is no longer active as a suction connection. Then follows a reversal from duct 1 to the suction pump of duct 2.

The subsequently dosed amount, the same as the dead volume amount, are tested by means of the vacuum switch and/or the capacitive sensor, the drain off period being awaited by a redundant inquiry of "oil available" and "no oil available".

As a further step, the test bench control removes the hydraulic nozzle and electrically connected to a pneumatic wrench unit to shut the oil overflow orifice.

At the same time, via a temperature sensor, preferably attached to the side of the test bench, the oil temperature is determined and the value relayed to an attached test computer to calculate an offset amount via the measured oil temperature from a correction factor for correction of parameters specific to the test bench, from a factor for definition of the oil cooler variants on the vehicle side and the installation angle and from an empirically determined factor for correction of the temperature range (based on a defined temperature).

The calculated offset amount is subsequently dosed to the connection, preferably via the transmission cooler connection; an automated shutting of the open cooler orifices of the transmission with an oil-soluble grease plug follows in order not to produce any oil loss on the filled transmission during transportation until final shutting of the open cooler connection with valves advantageously made of plastic.

The inventive method makes a level filling possible in an operation point of say 40° C. with relation to the vehicle inclination and external cooler allowance amounts with a tolerance of substantially +/−100 g (corresponding to substantially +/−150 ml).

What is claimed is:

1. A method for filling transmissions with oil, particularly an automatic transmission of a motor vehicle, characterized in that by means of a filling device attached to an oil overflow orifice on the transmission, as first step a first oil filling is effected with a basic amount, that when the basic amount has been filled up, a suction of excess oil follows, there being carried out at the same time a continuous subsequent dosing with a filling input smaller than the suction input and that at the end a final oil adjustment is effected by single subsequent dosing of a specific amount of oil while the suction is cutoff, the oil overflow orifice on the transmission being shut after termination of a drain off time and suction of the overflowing oil.

2. The method according to claim 1, wherein the final oil adjustment takes place at idling rotational speed.

3. The method according to claim 1, wherein, in an additional step an oil offset amount is calculated which is subsequently dosed via a transmission orifice which is shut after the subsequent dosing.

4. The method according to claim 3, wherein the offset amount is calculated based on signals of a temperature sensor which detects a temperature value and relays the temperature value to an attached computer and from a correction factor for correction of parameters specific to a test bench, from a factor for defining oil cooler variants on a vehicle side and an installation angle and from an empirically determined factor for correction of a temperature range based on a defined temperature.

5. The method according to claim 1, wherein the filling operation is carried out after opening of a pipe connections to the transmission.

6. The method according to claim 1, wherein the method for filling transmissions with oil is carried out on a test bench.

7. The method according to claim 1, wherein during the first oil filling, one or more of static test steps and a converter pre-filling are carried out.

8. The method according to claim 1, wherein the excess oil is sucked by means of a hydraulic pump.

9. The method according to claim 1, wherein the subsequently dosed oil is pre-tempered.

10. The method according to claim 1, wherein the subsequently dosed amount is detected by means of one or more of a vacuum switch and a capacitive sensor, the draining off of oil being awaited.

11. The method according to claim 1, wherein a coaxial filling spindle with a sealed nozzle is used as filling device.

12. The method according to claim 11, wherein a filling spindle is used whose coaxial filling tube is designed as 2-duct system with an annular surface connection and a central filling pipe of curved design with vertically oriented inlet opening.

13. The method according to claim 11, wherein the filling device is hydraulically delivered.

* * * * *